United States Patent
Hall

[11] 3,906,664
[45] Sept. 23, 1975

[54] FLOWER PLANTER ASSEMBLY
[76] Inventor: Richard C. Hall, 3828 - 17th Ave. S., Minneapolis, Minn. 55407
[22] Filed: Aug. 21, 1974
[21] Appl. No.: 499,154

[52] U.S. Cl............................ 47/34; 47/32; D6/182
[51] Int. Cl.² ........................................... A01G 9/02
[58] Field of Search .......... 47/34, 19, 41, 34.13, 25, 47/34.1, 32, 41.11, 39 X; D6/182

[56] References Cited
UNITED STATES PATENTS
| | | | |
|---|---|---|---|
| 921,484 | 5/1909 | Turner | 47/32 |
| 2,017,308 | 10/1934 | Elmer | 47/32 X |
| 2,290,117 | 7/1942 | Mulford | 47/41 |

Primary Examiner—Edgar S. Burr
Assistant Examiner—James R. Feyrer

[57] ABSTRACT

The invention relates to a flower planter assembly which surrounds a tree, a yard light pole or a flag pole. The flower planter assembly is relatively easy to assemble and is aesthetically pleasing. The flower planter assembly includes a base member for holding dirt and a decor tray to facilitate the planting of flowers in the dirt or the holding of flower pots. The base member and decor tray are each made of a soft plastic material, each has a central opening to accommodate a pole or a tree, and each has a slit running from the central opening to the edge thereof to permit distortion so that the slit can be enlarged to permit the member to be slipped around a pole or a tree. The flower planter also includes a shroud member which covers the base member and the decor tray. The shroud member is installed by ringing the pole or tree, after it is lifted above the pole or tree, and then bringing it down to earth. The shroud member is given a decorative touch by it having a simulated brick or rock face, or the like.

5 Claims, 8 Drawing Figures

FLOWER PLANTER ASSEMBLY

This invention relates to a flower planter assembly which surrounds a tree, a yard light pole or a flag pole.

It is a main object of the invention to provide a flower planter assembly which is relatively easy to assemble and is aesthetically pleasing.

The flower planter assembly comprises a base member for holding soil and a decor tray to facilitate the planting of flowers or the holding of flower pots. The base member and decor tray each are made of a soft plastic material, each has a central opening to accommodate a pole or a tree, and each has a slit running from the central opening to the edge thereof to permit distortion so that the slit can be enlarged to permit the member to be slipped around a pole or a tree.

The flower planter also includes a shroud member which covers the base member and a decor tray. The shroud member is installed by ringing the pole or tree, after it is lifted above the pole or tree, and then bringing it down to earth. The shroud member is given a decorative touch by it having a simulated brick or rock face, or the like.

Other objects and advantages of the invention will become apparent from the following specification, drawings and appended claims.

Figure 1:
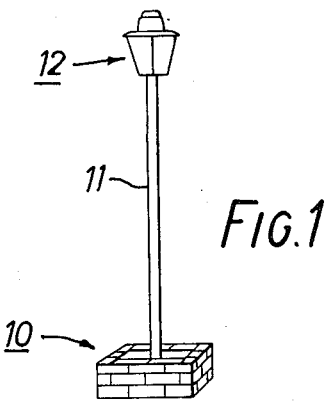
FIG. 1 is a perspective view of a yard light flower planter embodying the invention.

Referring to the drawings, there is shown in FIG. 1 a perspective view of a yard light flower planter 10 embodying the invention. The flower planter is in surrounding relation to a yard light which comprises a pole 11 and a lamp assembly 12.

Figure 8:
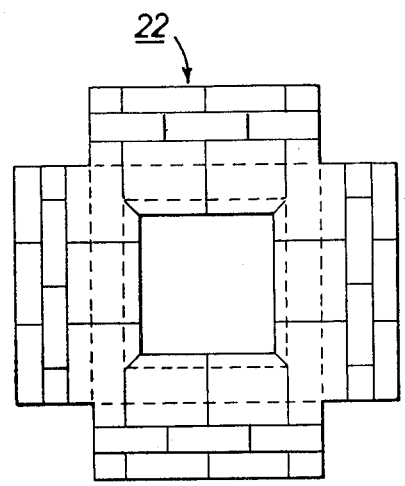
FIGS. 6 to 8 are views of the same three main parts of the flower planter illustrated in FIGS. 3 to 5 shown in their flat, unfolded states.
Figure 5:
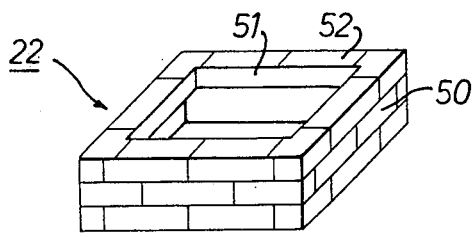
FIGS. 3 to 5 are perspective views of the three main parts of the flower planter arranged in the order in which they are assembled.

With reference to FIGS. 2 to 8, it may be noted that the flower planter is comprised of three main members which are a base member 20 (FIGS. 3 and 6), a decor tray 21 (FIGS. 4 and 7) and a shroud member 22 (FIGS. 5 and 8).

Base member 20 is made of a soft plastic material and has the form of a rectangularly shaped box with a floor 25 and vertical wall sections 26. Floor 25 has a central opening 28 to accommodate the presence of a yard light, flag pole, tree or the like. A slot or slit 30 extends from the opening 28 through the floor 28 on one side of the opening and through one of the wall sections 26. The slit 30 permits the base member 20 to be twisted and distorted in such a manner that the slit 30 is widened sufficiently to permit the passage therethrough of the pole 11 which is then accommodated by the opening 28.

The base member floor 25 has four smaller openings 32 through which spikes or the like (not shown) can be driven to fasten the base member 20 to the ground. In assembling the flower planter as shown in FIG. 1, the base member 20 is slipped around the pole 11 and fastened to the ground with spikes.

Decor tray 21 is made of a soft plastic material and has the form of a rectangularly shaped box with a floor 35 and vertical wall sections 36. Floor 35 has a central opening 38 to accommodate the presence of a yard light, flag pole, tree or the like. A slot or slit 40 extends from the opening 38 through the floor 35 on one side of the opening and through one of the wall sections 36. The slit 40 permits the decor tray 21 to be twisted and distorted in such a manner that the slit 40 is widened sufficiently to permit the passage therethrough of the pole 11 which is then accommodated by the opening 38.

The decor tray floor 35 has a plurality of smaller openings 42 to accommodate the planting of flowers therein of the insertion of flower pots (not shown) therein.

Figure 2:
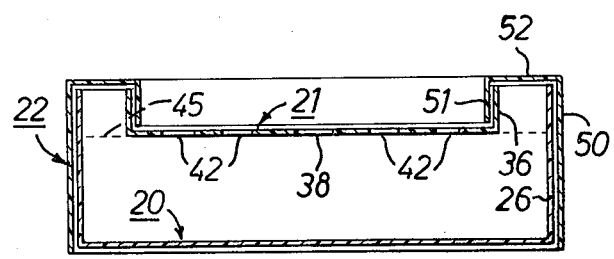
FIG. 2 is a vertical section view of the flower planter shown in FIG. 1.

The dimensions of the decor tray 21 are generally smaller than those of the base member 20 to the extent approximately indicated in the sectional view of FIG. 2.

In assembling the flower planter as shown in FIGS. 1 and 2 the base member 20, after being slipped around the pole 11 and fastened to the ground as explained above, is filled with soil up to the dotted line 45 indicated in FIG. 2. Decor tray 21 is slipped around the pole 11 and is set or placed on the dirt in the base member 20 at the level indicated by the line 45 in FIG. 2. When the decor tray is in this position, soil is removed from the spaces under the holes 42 and flowers are planted in these spaces or flower pots (not shown) containing flowers are inserted in the openings 42.

In the final step of the assembly the shroud member 22 is placed in surrounding relation to the pole 11 and the base member 20 by first being lifted up and above the lamp assembly 12 and then lowered down over it. Shroud member 22 can be made of any suitable material and has a generally rectangular shape with vertically extending outer walls 50, downwardly extending flange sections 51 arranged inwardly of the walls 50, and a horizontally extending border section 52 which extends from the upper ends of the walls 22 to the upper ends of the flange sections 51. The dimensions of the border section 52 are such that (1) the shroud member walls 50 have a slightly larger perimeter than the perimeter of the base member wall sections 26 and (2) the shroud member flange sections 51 have a slightly smaller perimeter than the perimeter of the decor tray wall sections 36.

The shroud member 22 is illustrated as having a simulated brick treatment but other aesthetic decors such as simulated rocks could also be used.

Although the flower planter which comprises the base member 20, the decor tray 21 and the shroud member is illustrated as being four-sided, any practical multisided arrangement from three to six or eight sides could also be used as desired.

Figure 7:
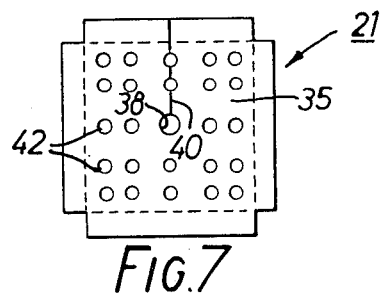
Figure 4:
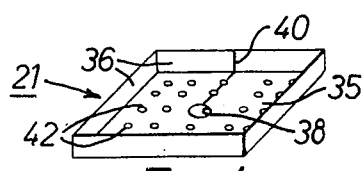
Figure 6:
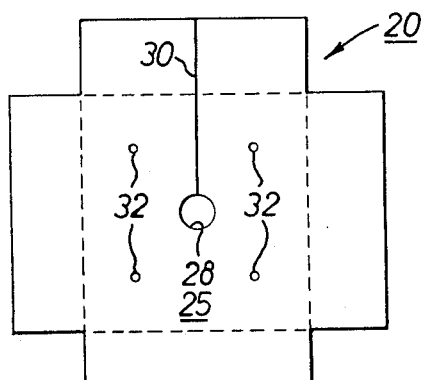
Figure 3:
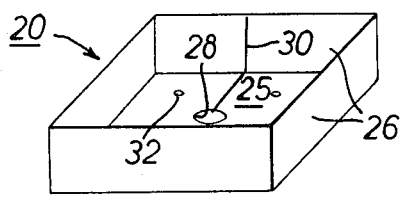

FIGS. 6, 7 and 8 show the three main parts of the flower planter in their flat, unfolded states. These parts can be conveniently and inexpensively made with a stamping operation and the corresponding end product parts shown in FIGS. 3 to 5 are made by bending the walls or flanges and cementing the edges thereof and together to form the corners.

I claim:

1. A yard light flower planter comprising a multisided base member for receiving a quantity of soil and being made of a soft plastic material with a floor and multiple vertical wall sections, said base floor having a central opening for accommodating a yard light with a slit extending therefrom to an edge of said base floor and through one of said wall sections, a multisided decor tray made of a soft plastic material with a floor and multiple vertical flange sections, said tray floor having a central opening for accommodating a yard light with a slit extending therefrom to an edge of said tray floor and through one of said flange sections, said decor tray being smaller than said base member and being supported on a quantity of soil therein in spaced relation thereto, a multisided shroud member having outer walls externally of and adjacent said base member wall section, said shroud member having flange interiorly of and adjacent said decor tray flange sections, said shroud member having a horizontally extending section connecting the upper ends of said walls thereof to said flanges thereof.

2. A yard light flowr planter flower to claim 1 wherein said base member, said decor tray and said shroud member are each rectangularly shaped.

3. A yard light flower planter according to claim 1 wherein said base member floor has a plurality of holes to allow attaching thereof to the subsoil and water drainage therefrom.

4. A yard light flower planter according to claim 1 wherein said decor tray has a plurality of holes for flower plantings.

5. A yard light flower planter according to claim 1 wherein said shroud member has a decorative appearance.

* * * * *